Patented Jan. 12, 1932

1,840,756

UNITED STATES PATENT OFFICE

ERWIN WALZ, OF MANNHEIM, AND OTTO AMBROS, OF LUDWIGSHAFEN-ON-THE-RHINE, GERMANY, ASSIGNORS TO WINTHROP CHEMICAL COMPANY, INC., OF NEW YORK, N. Y., A CORPORATION OF NEW YORK

PRODUCTION OF STEROLS AND OTHER VALUABLE SUBSTANCES FROM YEAST AND LIKE MICRO-ORGANISMS

No Drawing. Application filed December 20, 1928, Serial No. 327,474, and in Germany January 2, 1928.

In the copending application Ser. No. 266,450 filed March 3, 1928, one of the present inventors together with another have described a process for the production of valuable products from micro-organisms or animal or vegetable substances by extraction, pressing or the like in which the initial materials are previously subjected to enzymatic degradation by which means the cell walls are dissolved. In this manner the setting free of the products to be recovered from their organic complexes is considerably facilitated. In the manufacture of ergosterol, for example from yeast, the dissolution of the cell walls is effected by autolysis, and the subsequent chemical treatment with alcoholic caustic potash is thus materially assisted.

We have now found that this process can be carried out in a particularly advantageous manner by converting the bulk of the initial materials into water-soluble compounds by a practically complete enzymatic degradation, preferably under sterile conditions, separating the said compounds from the undissolved residue and by then working up each of the separate products into the desired compounds separately. The degree of degradation can be easily ascertained by subjecting a sample of the portion insoluble in water to the biuret test, which is negative when the degradation is complete. By working in this manner there is the great advantage that the valuable constituents, for example sterols, are greatly concentrated in the insoluble fraction. The isolation of these constituents can therefore be carried out with a much smaller expenditure of reagents and at the same time under much simpler working conditions than otherwise.

When treating yeast in accordance with the aforedescribed process and especially when maintaining a hydrogen-ion concentration of from $pH = 6$ to $8$ during the degradation of the yeast valuable by-products for example amino acids such as tyrosine, or purine derivatives such as xanthine and the like crystallize from the mixture and can be obtained in a state of high purity by a simple filtration of the whole mass through a filter with wide meshes, such as a sieve made of metal gauze. The solution containing the colloidal water-insoluble products and the water-soluble degradation products is then worked up in the usual manner.

The following example will further illustrate the nature of this invention but the invention is not restricted thereto.

*Example*

4 kilograms of pressed yeast are liquefied with 80 cubic centimeters of ethyl acetate and the mixture is then brought to a hydrogen-ion concentration of $pH = 6$ to $8$ by the addition of dilute aqueous ammonia. Then the autolysate is thoroughly shaken with another 20 cubic centimeters of ethyl acetate and allowed to stand in a vessel closed by a liquid seal. After several days the enzymatic degradation of the cell materials has so far progressed that tyrosine begins to separate out. The large-grained crystal aggregates, about 20 grams, are then separated by means of a close-meshed wire sieve.

The liquid autolysate from which the tyrosine has been separated, is then centrifuged in order to recover the undissolved fraction. The latter is a semisolid mass of a volume of about 1 liter and contains the whole of the ergosterol. All the ergosterol may be obtained in the free state after a short saponification of the semisolid mass with 400 grams of caustic alkali and a small quantity of solvent. About 14 grams of pure ergosterol having a melting point of from 155° to 157° centigrade are obtained.

The reduction in the expenditure of reagents as compared with the usual process amounts to 50 per cent and the increase in the yield of ergosterol amounts to more than 100 per cent. Moreover other valuable substances such for example as leucine can be obtained in large quantities from the aqueous solution recovered on centrifuging by the usual methods such as by evaporating and also all the usual cleavage products of yeast can be obtained in good yields from the separated liquid portion.

Very pure ergosterol can also be recovered from the separated crude product containing the ergosterol, after a simple dehydration, by esterification, for example by converting it by means of acetic anhydride into ergosterol acetate, which compound is readily isolated in consequence of its excellent capability for crystallizing, and subsequently saponifying the ergosterol ester.

What we claim is:—

1. In a process for the production of valuable products from yeast and like microorganisms, the steps comprising degrading the said substances practically completely by an enzymatic degradation, filtering off the crystalline degradation products of protein and separating the aqueous mixture obtained from the water-insoluble products.

2. In a process for the production of valuable products from yeast, the steps comprising subjecting yeast to complete autolysis, filtering off the crystalline degradation products of protein and separating the aqueous mixture obtained from the water-insoluble products.

3. In a process for the production of valuable products from yeast, the steps comprising subjecting yeast to complete autolysis at a hydrogen-ion concentration of from $pH = 6$ to $pH = 8$, filtering off the crystalline degradation products of protein and separating the aqueous mixture obtained from the water-insoluble products.

In testimony whereof we have hereunto set our hands.

ERWIN WALZ.
OTTO AMBROS.